United States Patent
Tartagni et al.

(10) Patent No.: US 6,191,593 B1
(45) Date of Patent: Feb. 20, 2001

(54) METHOD FOR THE NON-INVASIVE SENSING OF PHYSICAL MATTER ON THE DETECTION SURFACE OF A CAPACITIVE SENSOR

(75) Inventors: Marco Tartagni, Meldola (IT); Bhusan Gupta, Palo Alto, CA (US)

(73) Assignee: STMicroelectronics, Inc., Carrollton, TX (US)

( * ) Notice: Under 35 U.S.C. 154(b), the term of this patent shall be extended for 0 days.

(21) Appl. No.: 08/992,002

(22) Filed: Dec. 17, 1997

(51) Int. Cl.[7] .................................................. G01R 27/26

(52) U.S. Cl. ........................................... 324/687; 324/663

(58) Field of Search ................................... 324/662, 661, 324/687, 663

(56) References Cited

U.S. PATENT DOCUMENTS

| | | | |
|---|---|---|---|
| 3,493,855 | * 2/1970 | Norwich | 324/662 |
| 3,641,431 | 2/1972 | Pigage et al. | |
| 3,781,855 | 12/1973 | Killen | |

(List continued on next page.)

FOREIGN PATENT DOCUMENTS

| | | |
|---|---|---|
| 0 226 082 A1 | 6/1987 | (EP) . |
| 0 397 244 A2 | 11/1990 | (EP) . |
| 0 397 244 A3 | 11/1990 | (EP) . |
| 0 397 244 B1 | 11/1990 | (EP) . |
| 0 454 883 B1 | 11/1991 | (EP) . |
| 0 455 070 B1 | 11/1991 | (EP) . |
| 0 710 593 A1 | 5/1996 | (EP) . |
| 0 779 497 A2 | 6/1997 | (EP) . |
| 0 779 497 A3 | 6/1997 | (EP) . |
| 0 786 745 A2 | 7/1997 | (EP) . |
| 0 786 745 A3 | 7/1997 | (EP) . |
| 0 790 479 A1 | 8/1997 | (EP) . |
| 0 791 899 A2 | 8/1997 | (EP) . |
| 0 791 899 A3 | 8/1997 | (EP) . |
| 2279756A | 1/1995 | (GB) . |

(List continued on next page.)

OTHER PUBLICATIONS

Wolffenbuttel et al., "Integrated Tactile Imager With An Intrinsic Contour Detection Option," *Sensors and Actuators*, 16:141–153, Jan. 1989.

Sarma et al., "Capacitance–Type Blade–Tip Clearance Measurement System Using a Dual Amplifier with Ramp/DC Inputs and Integration," *IEEE Transactions on Instrumentation and Measurement* 41(5):674–678, Oct. 1992.

Young et al., "Novel Fingerprint Scanning Arrays Using Polysilicon TFT's on Glass and Polymer Substrates," *IEEE Electron Device Letters*, 8(1):19–20, Jan. 1997.

Tartagni et al., "A 390dpi Live Fingerprint Imager Based on Feedback Capacitive Sensing Scheme," IEEE International Solid–State Circuits Conference, Feb. 7, 1997, 5 pp.

*Primary Examiner*—Safet Metjahic
*Assistant Examiner*—Jose M. Solis
(74) *Attorney, Agent, or Firm*—David V. Carlson; Theodore E. Galanthay; Lisa K. Jorgenson

(57) ABSTRACT

A capacitance sensor detects the absence/presence of physical matter on a sensing surface of the sensor. The capacitive sensor is a multi-cell sensor wherein each cell has one or more buried, protected, and physically inaccessible capacitor plates. The sensor is physically placed in an environment that is to be monitored for deposition of a particle, vapor, and/or drop of a foreign material on the sensing surface. All cells are initially placed in a startup condition or state. Thereafter, the cells are interrogated or readout, looking for a change in the equivalent feedback capacitance that results from an electrical field shape modification that is caused by the presence of physical matter on the sensing surface. When no such change is detected, the method is repeated for another cell. When a change is detected for a cell, a particle/vapor/drop output is provided. As an optional step, the sensor is provided with a layer of a material that is selectively reactive to or reactive with, a particle/vapor/drop of a known type of foreign material.

28 Claims, 2 Drawing Sheets

U.S. PATENT DOCUMENTS

| | | |
|---|---|---|
| 3,873,927 | 3/1975 | Overall . |
| 3,967,310 | 6/1976 | Horiuchi et al. . |
| 4,016,490 | 4/1977 | Weckenmann et al. . |
| 4,096,758 * | 6/1978 | Moorg .................................. 324/661 |
| 4,161,743 | 7/1979 | Yonezawa et al. . |
| 4,183,060 | 1/1980 | Barnette et al. . |
| 4,353,056 | 10/1982 | Tsikos . |
| 4,394,773 | 7/1983 | Ruell . |
| 4,428,670 | 1/1984 | Ruell et al. . |
| 4,429,413 | 1/1984 | Edwards . |
| 4,513,298 | 4/1985 | Scheu . |
| 4,571,543 | 2/1986 | Raymond et al. . |
| 4,577,345 | 3/1986 | Abramov . |
| 4,626,774 | 12/1986 | Regtien . |
| 4,656,871 * | 4/1987 | Czarnocki ............................. 324/662 |
| 4,763,063 * | 8/1988 | Shkedi ................................. 324/662 |
| 4,814,691 | 3/1989 | Garbini et al. . |
| 4,935,207 | 6/1990 | Stanbro et al. . |
| 4,958,129 | 9/1990 | Poduje et al. . |
| 5,028,876 * | 7/1991 | Cadwell ............................... 324/662 |
| 5,325,442 | 6/1994 | Knapp . |
| 5,373,181 | 12/1994 | Scheiter et al. . |
| 5,430,381 | 7/1995 | Dower . |
| 5,530,581 | 6/1996 | Cogan . |
| 5,659,626 | 8/1997 | Ort et al. ............................. 382/125 |
| 5,778,089 | 7/1998 | Borza . |
| 5,828,773 | 10/1998 | Setlak et al. . |
| 5,852,670 | 12/1998 | Setlak et al. . |
| 5,862,248 | 1/1999 | Salatino et al. . |
| 5,869,791 | 2/1999 | Young . |
| 5,903,225 | 5/1999 | Schmitt et al. . |
| 5,920,640 | 7/1999 | Salatino et al. . |
| 5,973,623 | 10/1999 | Gupta et al. . |
| 6,011,859 | 1/2000 | Kalnitsky et al. . |

FOREIGN PATENT DOCUMENTS

| | | |
|---|---|---|
| 2279757A | 1/1995 | (GB) . |
| 2312514A | 10/1997 | (GB) . |
| WO 97/40744 | 11/1997 | (WO) . |
| WO 98/49691 | 11/1998 | (WO) . |
| WO 99/28701 | 6/1999 | (WO) . |

* cited by examiner

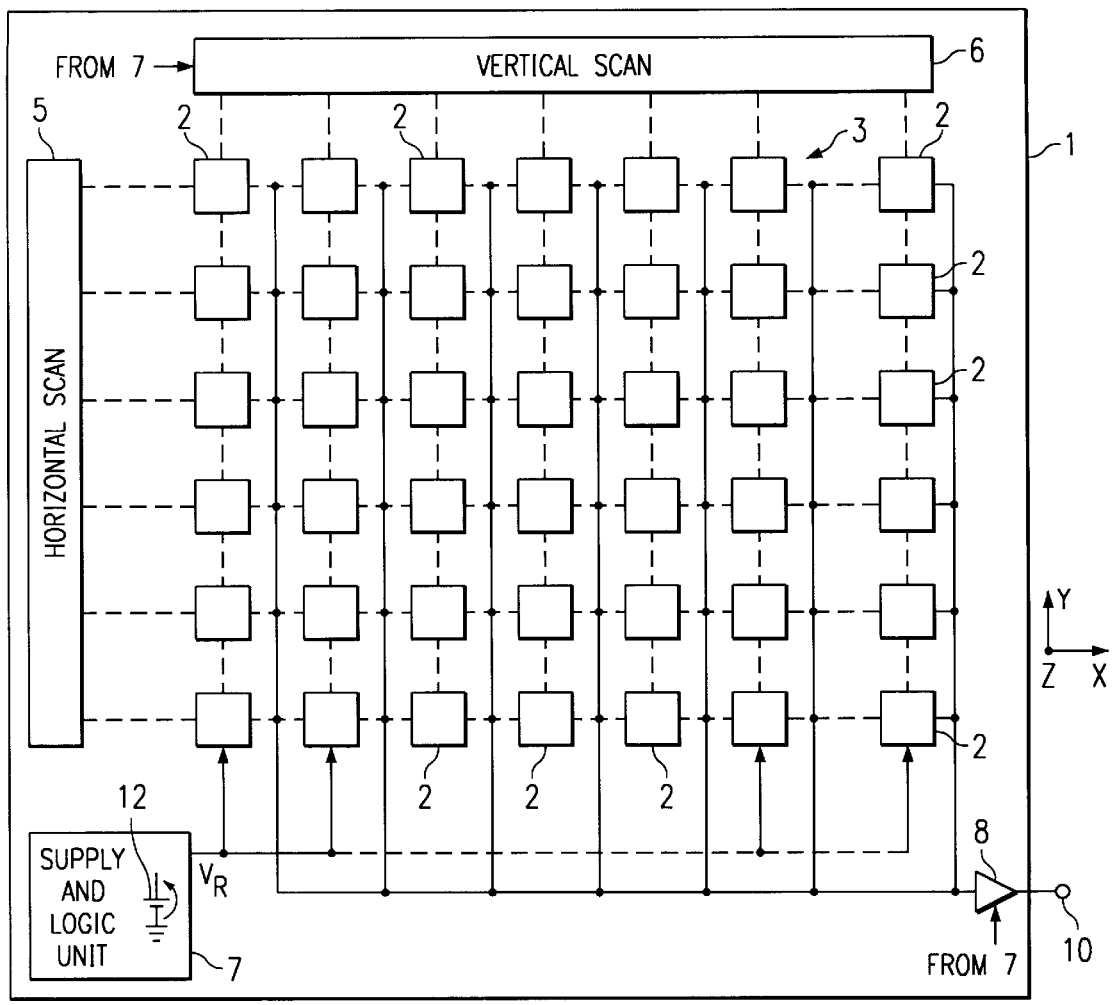
FIG. 1
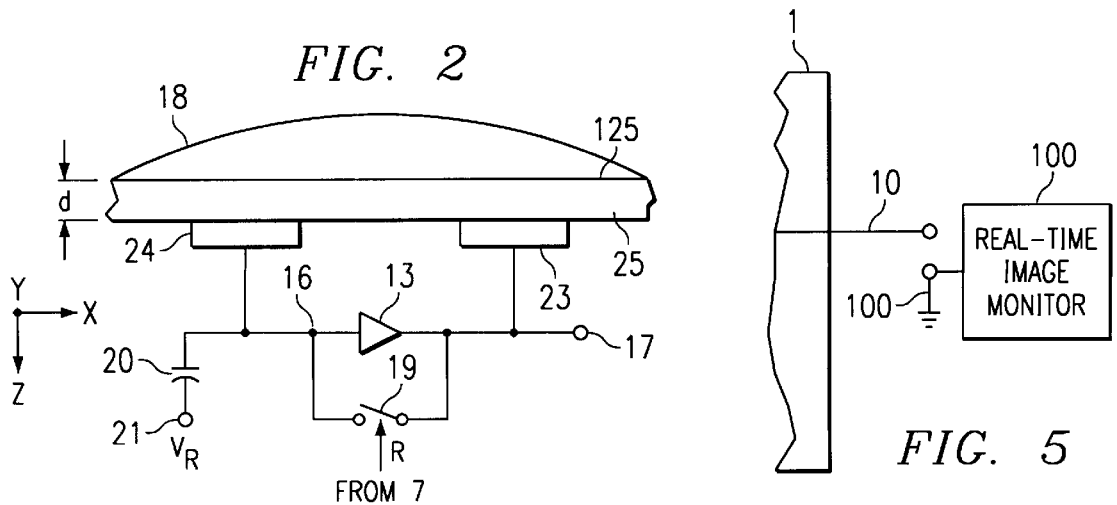
FIG. 2
FIG. 5

METHOD FOR THE NON-INVASIVE SENSING OF PHYSICAL MATTER ON THE DETECTION SURFACE OF A CAPACITIVE SENSOR

CROSS-REFERENCE TO RELATED APPLICATIONS

U.S. patent application Ser. No. 08/799,548, filed Feb. 13, 1997, now abandoned, and entitled CAPACITANCE DISTANCE SENSOR is incorporated herein by reference. This application describes a type of capacitance distance sensor whose utility is described as that of fingerprinting. The capacitance sensing array of this application is of a type that may be used in the method of the present application.

BACKGROUND OF THE INVENTION

1. Field of the Invention

This invention relates to the field of foreign material or foreign matter sensing. More specifically, this invention relates to a capacitance-type sensor having an exposed detection surface, the sensor operating to provide an electrical output signal whenever physical matter on the sensor's detection surface changes the dielectric constant or the electric field shape that exists between two buried capacitor plates.

2. Description of the Related Art

The present invention relates to a capacitance sensor that operates to detect the presence of physical matter on an upper located detection surface of the sensor. The use of capacitance-type sensors is generally known.

For example, the publication SENSORS AND ACTUATORS, January/February 1989, no. 1/2, at pages 141–153, contains an article entitled INTEGRATED TACTILE IMAGER WITH AN INTRINSIC CONTOUR DETECTION OPTION that was presented at the Fourth International Conference on Solid-State Sensors and Actuators (Transducers '87), Tokyo, Japan, Jun. 2–5, 1987. This article describes an integrated capacitive tactile imaging sensor that comprises a multi-layer construction having a bottom ceramic support, a 9-row/9-column array of square aluminum electrodes that are contained on a silicon wafer integrated circuit, a flexible and isolating intermediate layer that is made up of natural rubber, a thin conductive rubber layer, and a top protective layer. In this device, capacitance depends upon local deformation of the natural rubber layer. The 81 individual aluminum electrodes of this device provide capacitive measurement of an indentation pattern within the natural rubber layer, this indentation being caused by a pressure distribution that acts on the top protective layer.

The use of a capacitance-type sensor to sense the minutiae of a fingerprint is also known.

For example, the publication IEEE ELECTRON DEVICE LETTERS, VOL. 18, NO. 1, JANUARY 1997, pages 19–20, contains an article entitled NOVEL FINGERPRINT SCANNING ARRAYS USING POLYSILICON TFT'S OF GLASS AND POLYMER SUBSTRATES. This article describes a two-dimensional (2-D), 200×200, capacitance sensing array that is made up of 40,000 individual pixels. Each pixel of the array includes two Thin Film Transistors (TFTs) and a capacitor plate. Each array pixel resides at the intersection of an array-row and an array-column, and each array pixel is individually addressable by way of row-driver circuits and column-driver circuits.

Considering the two TFTs, hereinafter called TFT-A and TFT-B, that are associated with a given pixel, the drain electrodes of TFT-A and TFT-B are connected to the pixel's capacitor plate, the gate electrode and the source electrode of TFT-A are connected to a row-conductor that is associated with the pixel, the gate of TFT-B is connected to the following row-conductor, and the source of TFT-B is connected to a column-conductor that is associated with the pixel.

A thin (0.1 micrometer) silicon nitride insulator overlies the capacitor plate of each array pixel. When the ridge of a fingerprint lies directly over the capacitor plate, a capacitor is formed between the capacitor plate and the finger. This capacitor is charged when a row-pulse (8 to 10 VDC, and of 10 to 100 micro second duration) is applied to the pixel by way of the row-conductor that is associated with this pixel and TFT-A. This stored charge is thereafter transferred onto the pixel's column-conductor through TFT-B when a row-pulse is applied to the following row-electrode.

Also of interest is the publication 1997 IEEE INTERNATIONAL SOLID-STATE CIRCUITS CONFERENCE that contains and article beginning page 200 entitled A 390DPI LIVE FINGERPRINT IMAGER BASED ON FEEDBACK CAPACITIVE SENSING SCHEME. This article describes a single-chip, 200×200 element array, 2-metal digital CMOS technology, sensor that is based upon feedback capacitance sensing, and that operates to detect the electrical field variation that is induced by the finger's skin surface. In each element of the array, two horizontally spaced metal plates are separated from the overlying and adjacent portion of the finger's skin surface by passivation oxide. Since the distance between the skin and the sensor's surface identifies the presence of the fingerprint's ridges and valleys, an array of elements provides a complete fingerprint pattern.

In each element of the array, the two metal plates are respectively connected to the input and the output of a high-gain inverter, to thereby form a charge-integrator. In operation, the charge-integrator is first reset by shorting the input and output of the inverter. A fixed amount of charge is then sinked from the input, causing the output voltage to swing inversely proportional to a feedback capacitance value that is inversely proportional to the distance to the fingerprint's ridges and valleys. The array of cells, or sensors, thus provides the complete fingerprint pattern. The fingerprint image disappears when the finger is removed from the array.

Capacitance sensors as above described generally rely on single-plate cells, and devices of this type are generally very noisy with respect to the sensing of drops or particles, especially electrically charged drops or particles.

U.S. Pat. No. 4,353,056, incorporated herein by reference, is of interest in that it relates to a capacitance-type fingerprint sensor wherein a finger is pressed onto the sensor's surface in order to read the ridges and valleys of the fingerprint. The sensor-surface has a large number of capacitors of a small physical size associated therewith. Two sensors are described. In a first type of sensor, an electrical insulator carries a number of flexible and horizontally spaced curved metal electrodes, two adjacent metal electrodes of which comprise one capacitor. A protective insulating film overlies the electrical insulator, and when a finger is brought into physical contact with this protective insulating film, the metal electrodes are physically deformed, thereby selectively changing the capacitance of the large number of capacitors in accordance with the fingerprint's ridge/valley pattern. In a second type of sensor, the top surface of a rigid support carries a number of horizontally spaced and flat metal electrodes in a fixed position. Placed above the plane of the metal electrodes is the sequential arrangement of a flexible insulator, a flexible electrode, and a flexible protective membrane. A capacitor is formed between the top flexible electrode and each of the lower and fixed-position flat metal electrodes. When the end of a finger is brought into contact with the flexible membrane, the flexible electrode becomes wavy in accordance with the fingerprints' ridges/valleys pattern. The device of patent '056 does not provide active or amplified pixels, and small signal to noise ratios result therefrom.

In addition, U.S. Pat. No. 5,325,442, incorporated herein by reference, relates to a capacitance-type fingerprint sensor having a sensing pad that comprises a planar array of row/column sensing elements having a pitch of about 100-micrometers. Each sensing element is located at the intersection of a row conductor and a column conductor, and in each sensing element, a sensing capacitor is made up of a planar sensing electrode that is spaced from a finger surface by way of an insulating film that overlies the sensing electrode. The plurality of sensing electrodes that make up the array are regularly spaced and equal size rectangles. Noise is again a problem with patent '442.

The sensing elements are fabricated using photolithographic processes, and each individual sensing element includes a Thin-Film-Transistor (TFT) in the form of a Field-Effect-Transistor (FET). Each FET gate is connected to a row conductor, each FET source is connected to a column conductor, and each FET drain is connected to a sensing electrode.

In one embodiment, each sensing element comprises a sensing capacitor that is formed between a sensing electrode and the finger. In another embodiment, each sensing element includes an electrically isolated and conducting pad that is physically engaged by the finger.

European patent application 96830068.1, Feb. 14, 1996, is also of general interest relative to capacitor sensing.

While prior devices as above described are generally useful for their limited intended use, a need remains in the art for an improved method of placing a capacitance type sensor in an environment that is to be monitored for the presence of foreign matter, to thereby provide for the non-invasive sensing of any foreign matter that may thereafter be deposited on a detection surface of the capacitance type sensor.

SUMMARY OF THE INVENTION

The present invention provides an improved non-invasive method of using a capacitive sensor for sensing the presence of foreign physical matter thereon, wherein the sensor's internal circuitry and the like is electrically and thermally isolated from the sensor's detection surface upon which the foreign matter may collect. Operation of the present invention requires that the presence of such foreign matter on the sensor's detection surface operates to change the dielectric constant, or operates to change the electric field shape, between two capacitor plates that are physically isolated from the detection surface.

For example, the method of this invention finds utility in the sensing of very small drops of corrosive, or explosive, liquids whose absence in an area being monitored is critical to safety. In addition, the method of this invention may be used to sense the occurrence of steam or vapor condensation, may be used to sense the occurrence of an undesirable non-conducting material, and may be used to sense the occurrence of, or the growth of, both undesirable and desirable biological cultures, such as germs and/or bacteria.

The present invention provides a compact array of a number of individual capacitance sensing cells; for example, an array having a size of about one square inch. Multi-cell arrays in accordance with the present invention can be used to count the number of particles or drops, as the cells are individually readout. In this case, the multi-cell array output can, for example, be related to the condensation level of the particle/drop material. In addition, a one cell array of the present invention can be provided to perform the same or a similar function.

In a preferred embodiment of this method invention, a sensing array comprises a plurality of pixels, and each pixel includes a solid state device having a pair of buried, horizontally spaced, metal capacitor plates and a dielectric-buried, signal-inverting, Integrated Circuit (IC), amplifier that is responsive to a change in the capacitance value of a capacitor that is formed by these two plates.

When the sensing surface immediately above the two buried capacitor plates is bridged by the deposition of foreign material thereon, which foreign material operates to change the dielectric constant or electric field shape between the two buried metal plates, or when the sensing surface immediately above two capacitor plates is bridged by deposition of a foreign material thereon that shields or modifies the shape of an electrostatic field that extends between the two metal plates, the IC provides an electrical output that is indicative of the presence of the foreign material.

In an embodiment of this method invention, the above-mentioned two capacitor plates for each array pixel are covered by a top-most and exposed reactive layer. This exposed reactive layer is physically engaged by, and chemically reacts with, a known type of foreign matter that may deposit thereon, to thereby enhance detection of the presence of this known type of foreign matter. For example, a reactive layer is provided that reacts with alcohol vapors to enable sensing of the presence of alcohol in the breath of a human being.

In methods in accordance with the present invention, sensing areas as small as 50-micro meters square can be sampled, or sensed, at rates as high as 2.5-MHz.

Advantages of this method invention are that the sensing surface is provided as an electrical insulating layer, electrical current does not flow through this sensing surface, and the sensing array is of a very small physical size.

A method in accordance with this invention operates to sense a change in an electric field that extends, or exists, between two capacitor plates that lie under, and are buried within, a top-most electrically insulating layer. In this way, the method of this invention ensures that the capacitor plates do not interact with the sensor's outer environment, except for the presence of a fringing electrical field that extends between the two capacitor plates and extends a short distance into this outer environment. The presence of foreign material on the sensor's top-most sensing surface is sensed as a result of one or both of a change in the dielectric constant between the two buried capacitor plates, and a change in the electrostatic shielding of the two buried capacitor plates. In accordance with this invention, these two effects can be detected as a continuous monotonic function, or these two effects can be detected as discrete levels when a threshold amplifier is provided.

These and other features and advantages of the present invention will be apparent to those of skill in art upon reference to the following detailed description of preferred embodiments of the invention, which description makes reference to the drawing.

BRIEF DESCRIPTION OF THE DRAWING

FIG. 1 is a top view of an Integrated Circuit (IC) device that is useful in practicing the method of this invention this figure including a generally planar, multiple pixel, multiple row/column, sensor array having a relatively large number of solid state capacitive sensor cells.

FIG. 2 schematically shows the circuit of a single cell of FIG. 1's array 3, wherein all cells are of generally identical physical and electrical construction.

FIG. 5 shows the use of a real-time image monitor to monitor the output of the FIG. 1 Integrated Circuit (IC).

DESCRIPTION OF THE PREFERRED EMBODIMENT

Figure 3:
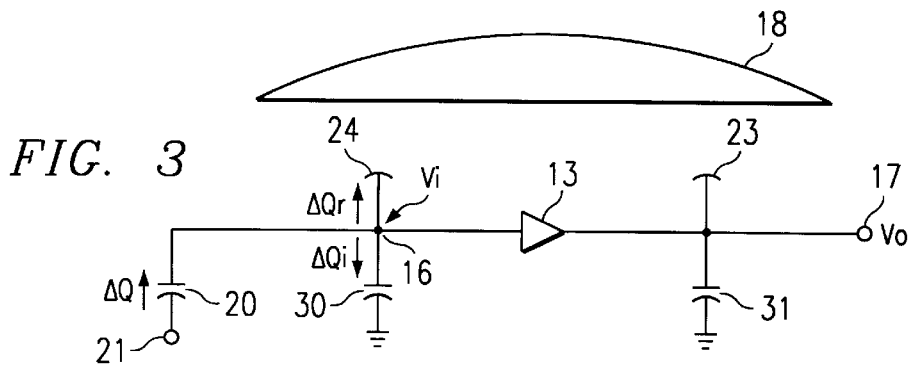
FIG. 3 is an equivalent circuit of the single cell circuit shown in FIG. 2.

FIG. 1 is taken from the above-mentioned related patent application. FIG. 1 is a top view of an Integrated circuit (IC) device 1 that includes a generally planar, multiple pixel, multiple row/column, sensor array 3 having a relatively large number of solid state capacitive sensor cells 2.

As shown, FIG. 1 is taken in the X-Y plane. Array 3 contains the number N of horizontal or X-direction extending rows of individual capacitance sensor cells 2, each row having the number M of individual sensor cells 2 therein, and array 3 contains the number M of vertically or Y-direction extending columns of individual capacitance sensor cells 2, each column having the number N of individual sensor cells 2 therein, wherein the numbers N and M are integers that may of may not be equal to each other.

The number of individual picture elements, pixels, or cells 2 within array 3 is quite large, and equals the product of M×N. Examples are from about 200 to about 512 dots, pixels, or cells 2 per inch within array 3, each cell 2 being of a physical size of about 0.35 to about 0.70 micrometers square, and array 3 being about 1.0 inch square.

While the planar X-Y area occupied by array 3 can be very small, the corresponding area that will be monitored for particle or drop presence or absence will, of course, go down as this X-Y array area decreases.

The present invention provides a method of using such a capacitance type sensor array 3 to very quickly and accurately detect the occurrence of foreign particle/drop material on an upper X-Y area sensing surface of IC device 1.

Each individual sensor cell 2 within array 3 is electrically addressable by virtue the cell being physically located at the intersection of a row/column of array 3. The manner in which the individual sensor cells 2 of array 3 are addressed and electrically read out is well known to those of skill in the art and does not form a limitation on this method invention.

IC device 1 includes a horizontal, or row scanning stage or network 5, and a vertical or column scanning stage or network 6 for interrogating or reading one cell 2 at a time, according to any predetermined scanning pattern. Preferably, stages 5 and 6 comprise shift registers or decoders that operate to interrogate the outputs of cells 2 sequentially.

IC device 1 also includes a supply/logic stage or network 7 that operates to supply the various components within IC device 1, including all cells 2, with the necessary operating voltages, and to control the sequence of steps that are necessary for operation of IC device 1. In particular, a DC voltage source 12 provides a ground-referenced DC reference voltage $V_r$. A buffer 8 is connected to the outputs of all cells 2. Output 10 of buffer 8 and a ground connection (not shown) comprises the electrical particle/drop present/absent output of IC device 1, the signal at output 10 being controlled by operation of scanning stages 5 and 6.

FIG. 2 schematically shows the circuit of a single cell 2 of FIG. 1's array 3, all cells 2 being generally identical in physical and electrical construction and arrangement. Each cell 2 includes a low-power, signal-inverting amplifier 13 having an exemplary gain of from about 1000 to about 2000. Terminal 21 comprise an input to the circuit of cell 2, and terminal 21 and input capacitor 20 connect to input 16 of amplifier 13. Terminal 17 comprises the output of cell 2 and amplifier 13. Each cell 2 also includes two X-Y planar armatures, or metal capacitor plates 23,24, that are of generally equal area and are horizontally or X-direction spaced from each other within a common X-Y horizontal plane. A thin and upper-most dielectric layer 25 covers capacitor plates 23,24. The upper horizontal surface 125 of layer 25 provides an array surface for physical contact by foreign matter 18 (i.e., a particle or a drop) to be sensed or detected. Dielectric layer 25 preferably covers the entire surface of the portion of IC device 1 that includes array 3 and its individual cells 2.

In use, array 3 and its upper dielectric layer 25 are mounted in a room, enclosure, or environment that is to be monitored for the presence of and deposition on, or the absence of, any particles/drops 18. When one or more particles of material 18 deposit on the upper horizontal surface 125 of layer 25, this material 18 operates to define with plates 23,24 a capacitor 23,18,24 that is connected in negative feedback fashion from amplifier output 17 to amplifier input 16.

Each cell 2 also includes a normally-open reset, control, or startup switch 19, preferably in the form of a MOS switch. Switch 19 selectively operates to short amplifier input 16 to amplifier output 17 upon startup of sensor array 3. Switch 19 is controlled by a control signal "R" that is provided by FIG. 1's supply and logic unit 7. At startup, switches 19 of all array cells 2 are momentarily closed, and the voltage level at all cell inputs 21 is maintained at a constant magnitude. In this way, the input voltage of all cells 2 is brought to the same potential as the cell's output voltage.

Shortly thereafter, supply and logic unit 7 operates to open all reset switches 19, and to supply all cell inputs 21 with a step voltage that is equal in magnitude to reference voltage $V_R$. An electrical charge is now induced at each of the cell input capacitors 20, thus permitting the reading of the local and individual Z-direction cell distances "d" that exist between a cell's capacitor plates 23,24, and any material particle 18 that may then overly a cell's capacitor plates 23,24.

Scanning stages 5,6 of FIG. 1 operate to enable the reading or interrogation of the many cells 2 within array 3. In this way, buffer 8 operates to provide an output 10 in the form of gray levels of voltage that provide a three-dimensional readout and display of the foreign material 18 that may be currently resident on the top surface of array 3.

FIG. 3 is an equivalent circuit of the single cell circuit shown in FIG. 2. The input capacitance of amplifier 13 is shown at 30, the output capacitance of amplifier 13 is shown at 31, and 23,18,24 comprises the above mentioned material-sensitive capacitor.

Figure 4:
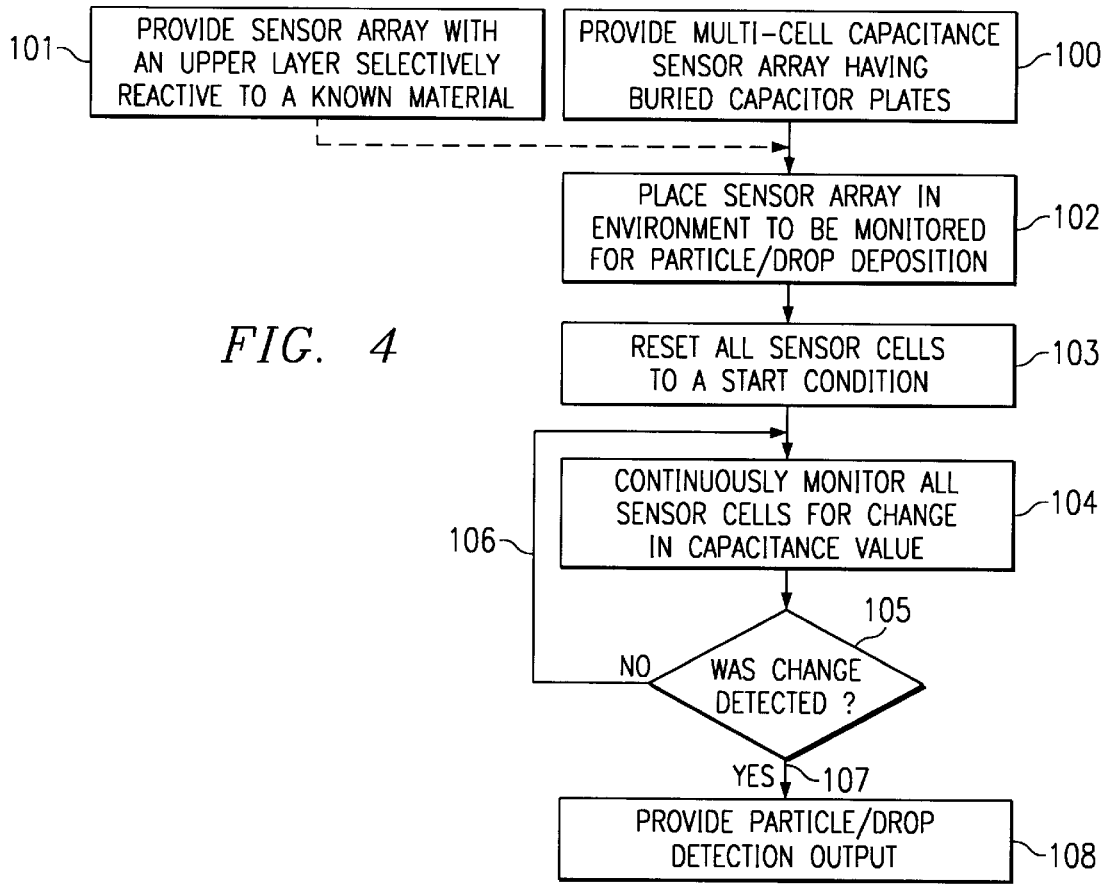
FIG. 4 is a flowchart that is useful in explaining the details of a referred embodiment of the present method invention.

FIG. 4 is a flowchart type showing of the present method invention. As a first step 100 of the present method invention, a multi-cell capacitance sensor, such as shown in FIGS. 1–3, is provided having one or more buried, protected, and physically inaccessible capacitor plates, such as buried capacitor plates 23,24 of FIGS. 1–3.

Step 101 provides an optional step whereby the top surface of 125 of dielectric layer 25 (see FIG. 2) is coated with, or provided with, a layer of a material that is selectively reactive to, or that selectively reacts with, a know particle/vapor/drop 18 of a foreign material.

Figure 6:
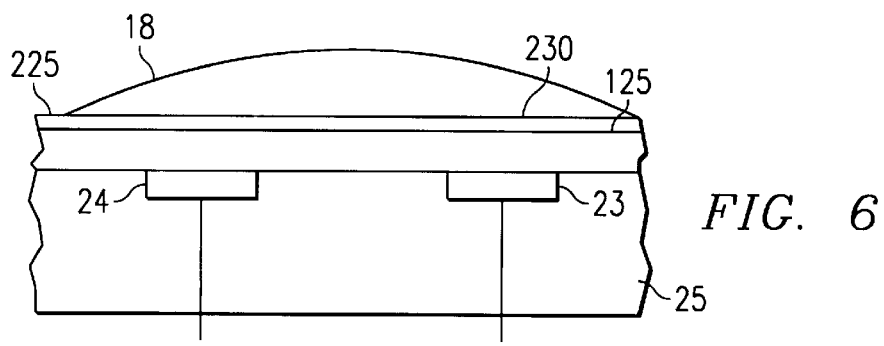
FIG. 6 shows an embodiment of the invention wherein the two capacitor plates, shown in FIG. 1, are buried within the body of a dielectric layer, and wherein the top surface of the dielectric layer is coated with a thin layer of a material that reacts with, or is sensitive to, a known material whose presence is to be detected by operation of the FIG. 1 IC device.

By way of example, relative to FIG. 4's optional step 101, and as is shown in FIG. 6 as an optional feature of the present method invention, the top surface 125 of dielectric layer 25 may be coated with a material 230 that provides a top reactive surface 225 that chemically reacts with a know material 18, such as alcohol vapor. When such a vapor 18, or drop 18, comes into physical contact with top reactive surface 225, the dielectric constant of this added material layer 230 and/or the vapor/drop 18 is changed. As a result, the capacitance value of negative feedback capacitor 23,18, 24 now changes, and array output 10 provides an output that is indicative of the presence of such a known vapor/drop 18 on top reactive surface 225.

At method step 102, the sensor of step 100 (or the sensor of steps 100 and 101) is physically placed in an environment that is to be monitored for deposition of a particle, vapor, or drop 18 of a foreign material onto the top surface 125 or 225 of dielectric layer 25 or of layers 25,230. While it is preferred that the sensor be physically placed with its top surface 125,225 in a horizontal attitude, this attitude may not be required in all instances.

Once the sensor is so located in the environment that is to be monitored for deposition of particle, vapor, and/or drop 18, step 103 is operable to momentarily activate all cell reset switches 19 (see FIG. 2) in order to place all cells 2 in a start condition, as above described.

Steps 104, 105 now operate to monitor the selected environment of step 102 for deposition of a particle, vapor, and/or drop 18.

More specifically, step 104 and networks 5,6 of FIG. 1 continuously operate to interrogate or read each individual cell 2 of array 3. For each cell 2, decision step 105 looks for a change in the capacitance value of a cell's feedback capacitor 23,18,24. When no such change is detected, the "no" output 106 of step 105 enables step 104 to repeat for another cell 2 of array 3. When a change is detected for a cell 2, the "yes" output 107 of step 105 enables step 108 to provide FIG. 1's output 10. That is, a particle/vapor/drop output 108 is provided.

FIG. 5 shows the use of a real-time image monitor 500 to monitor the output 10 of FIG. 1's IC 1. Monitor 500 may provide for the human monitoring of a picture that is provided by the cell pixels of FIG. 1, or machine monitoring of this multi-pixel digital picture may be provided.

FIG. 6 shows an embodiment of the present invention wherein the two capacitor plates 23,24 shown in FIG. 1 are buried within the body of dielectric layer 25. Also, in this embodiment of the invention, the top surface 125 of dielectric layer 25 is coated with a thin layer 230 of a material that reacts with, or is sensitive to, a known material 18 whose presence on surface 225 is to be detected by operation of the FIG. 1 IC device.

The present invention has been described in detail while making reference to preferred embodiment thereof. However, it is known that those skilled in the art will, upon reading this description, readily visualize yet other embodiments that are within the spirit and scope of this invention. Thus, the details of the forgoing description are not to be taken as a limitation on the spirit and scope of this invention.

What is claimed is:

1. A method of detecting the presence of physical matter on a sensing surface of a sensor device, comprising the steps of:

providing a sensor device having an array of individual sensing cells arranged in a closely spaced physical configuration;

providing a dielectric layer covering said array, said dielectric layer providing said sensing surface;

providing a coating on said sensing surface that is responsive to physical matter;

detecting the presence of said known physical matter on said coating;

providing each sensing cell with an amplifier having an input and an output;

providing output-to-input feedback for each of said amplifiers, said feedback being sensitive to the presence of said physical matter on said coating;

providing said feedback for each of said amplifiers by way of a first capacitor plate that is placed under said sensing surface and that is connected to said input and, a second capacitor plate that is placed under said sensing surface in close spatial relation to said first capacitor plate and that is connected to said output; and detecting the presence of physical matter on said coating.

2. The method of claim 1 including the step of:

burying said first capacitor plate and said second capacitor plate within said dielectric layer at a location that is closely spaced under said sensing surface.

3. The method of claim 1 including the step of:

placing said first and second capacitor plates on a common physical plane.

4. The method of claim 3 including the step of:

burying said first capacitor plate and said second capacitor plate within said dielectric layer at a location that is spaced from said sensing surface.

5. The method of claim 1 including the step of:

providing each of said amplifiers as signal-inverting amplifier; and providing said output-to-input feedback for each of said amplifiers as negative-signal feedback.

6. The method of claim 5 including the step of:

placing said first and second capacitor plates on a common physical plane.

7. The method of claim 6 including the step of:

burying said first capacitor plate and said second capacitor plate within said dielectric layer at a location that is closely spaced from said sensing surface.

8. The method of claim 1 including the step of:

prior to enabling said device to detect the presence of physical matter on said sensing surface, momentarily shorting said input to said output for each of said amplifiers.

9. The method of claim 8 including the step of:

providing each of said amplifiers as signal-inverting amplifier; and providing said output-to-input feedback for each of said amplifiers as negative feedback.

10. The method of claim 9 including the step of:

placing said first and second capacitor plates on a common physical plane.

11. A method that operates to detect the presence of physical matter on a coating over a sensing surface, comprising the steps of:

providing at least one sensing cell;

providing a dielectric layer for said at least one sensing cell, said dielectric layer having said sensing surface located thereon;

providing a coating of a material that chemically reacts with a known physical matter on said sensing surface;

providing with an amplifier having an input and an output;

providing output-to-input feedback for said amplifier, said feedback being sensitive to the presence of physical matter on said coating;

providing said feedback by way of a first capacitor plate that is placed under said sensing surface and that is connected to said amplifier input, a second capacitor plate that is placed under said sensing surface in close spatial relation to said first capacitor plate and that is connected to said amplifier output; and detecting when said known physical matter is present on said coating.

12. The method of claim 1 including the step of:

providing each of said amplifiers as signal-inverting amplifier; and providing said output-to-input feedback for each of said amplifiers as negative-signal feedback.

13. The method according to claim 11 wherein said physical matter to which the coating is sensitive is an explosive type matter.

14. The method of claim 11 including the step of:

burying said first capacitor plate and said second capacitor plate within said dielectric layer at a location that is spaced from said sensing surface.

15. The method of claim 11 including the step of:

placing said first and second capacitor plates on a common physical plane.

16. The method of claim 15 including the step of:

providing said amplifier as a signal-inverting amplifier; and providing said output-to-input feedback as negative-signal feedback.

17. The method of claim 16 including the step of:

momentarily shorting said input to said output.

18. The method according to claim 11 wherein the matter the coating is sensitive to is a biological culture.

19. The method of claim 11 including the step of:

providing said amplifier as a signal-inverting amplifier; and providing said output-to-input feedback as negative-signal feedback.

20. The method of claim 11 including the step of:

momentarily shorting said input to said output.

21. The method according to claim 1 wherein said coating is selectively responsive to the occurrence of vapor.

22. The method according to claim 21 wherein the vapor that the coating is selectively responsive to is an alcohol vapor.

23. The method according to claim 21 wherein the method said coating is responsive to is a water vapor.

24. The method according to claim 1 wherein said physical matter to which the coating is sensitive is an explosive type matter.

25. The method according to claim 1 wherein the matter the coating is sensitive to is a biological culture.

26. The method according to claim 11 wherein the coating is selectively responsive to the occurrence of vapor.

27. The method according to claim 11 wherein the vapor that the coating is selectively responsive to is an alcohol vapor.

28. The method according to claim 11 wherein the vapor that the coating is responsive to is a water vapor.

* * * * *